US006941351B2

(12) United States Patent
Vetrivelkumaran et al.

(10) Patent No.: US 6,941,351 B2
(45) Date of Patent: Sep. 6, 2005

(54) APPLICATION PROGRAM CACHING

(75) Inventors: Vellore T. Vetrivelkumaran, Redmond, WA (US); Erik B. Olson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 09/681,844

(22) Filed: Jun. 15, 2001

(65) Prior Publication Data

US 2002/0035674 A1 Mar. 21, 2002

Related U.S. Application Data

(60) Provisional application No. 60/217,602, filed on Jul. 11, 2000.

(51) Int. Cl.[7] .............................................. G06F 15/16
(52) U.S. Cl. ........................ 709/217; 709/217; 709/201; 711/119
(58) Field of Search ................................. 709/216–219, 709/201, 229, 203, 205, 212, 220; 711/119

(56) References Cited

U.S. PATENT DOCUMENTS

| | | | |
|---|---|---|---|
| 5,859,969 A | | 1/1999 | Oki et al. |
| 5,859,971 A | * | 1/1999 | Bittinger et al. ............ 709/203 |
| 5,919,247 A | * | 7/1999 | Van Hoff et al. ........... 709/217 |
| 6,065,043 A | | 5/2000 | Domenikos et al. |
| 6,073,129 A | * | 6/2000 | Levine et al. .................. 707/4 |
| 6,115,741 A | * | 9/2000 | Domenikos et al. ........ 709/217 |
| 6,205,481 B1 | * | 3/2001 | Heddaya et al. ............ 709/226 |
| 6,360,366 B1 | * | 3/2002 | Heath et al. ................. 709/203 |
| 6,430,564 B1 | * | 8/2002 | Judge et al. ................. 707/100 |
| 6,430,570 B1 | * | 8/2002 | Judge et al. ............ 707/103 R |
| 6,442,546 B1 | * | 8/2002 | Biliris et al. ................... 707/10 |
| 6,574,618 B2 | * | 6/2003 | Eylon et al. .................... 707/1 |
| 2001/0034736 A1 | * | 10/2001 | Eylon et al. ................. 707/200 |
| 2002/0138640 A1 | * | 9/2002 | Raz et al. .................... 709/231 |

FOREIGN PATENT DOCUMENTS

| | | |
|---|---|---|
| JP | 2000-115366 | 4/2000 |
| WO | WO 99/53422 | 10/1999 |

OTHER PUBLICATIONS

Igakura et al., "Management Middleware for Application Front-end on Active Networks," *The Institute of Electronics, Information and Communication Engineers*, vol. 99, No. 428, pp. 11–18 (1999).

European Patent Office, Partial Search Report in Corresponding Application No. 01116954.7, 4 pgs (Dec. 27, 2004).

* cited by examiner

*Primary Examiner*—Krisna Lim
*Assistant Examiner*—Yasin Barqadle
(74) *Attorney, Agent, or Firm*—Leydig, Voit & Mayer, Ltd

(57) ABSTRACT

Application program caching and execution is disclosed. An application program component, which may constitute the only component of an application program, is cached by a computing device from an original computing device. The computing device executes the cached component in lieu of its execution by the original computing device. The computing device may be a client computing device, where the client device executes the cached component for itself. The computing device may also be a caching computing device, where the caching device executes the cached component for the client computing device.

19 Claims, 10 Drawing Sheets

APPLICATION PROGRAM CACHING

CROSS REFERENCE TO RELATED APPLICATIONS

The present application is related to and claims the benefit and priority of the earlier filed provisional patent application entitled "Caching and Distributed Execution of Web Applications", filed on Jul. 11, 2000, and assigned Ser. No. 60/217,602.

BACKGROUND OF INVENTION

This invention relates generally to application programs executed by an original computing device for a client computing device, and more particularly to programs downloaded from the original device, cached, and executed for the client computing device by the client device and/or a caching computing device.

Traditionally, application programs have been executed locally by client computing devices. These programs include a wide variety of consumer- and business-related programs, such as word processing programs, accounting programs, personal information management (PIM) programs, and other types of programs. One of the advantages of executing programs locally has been and continues to be that the programs run as fast as the hardware of the client computing devices allows.

With the increasing popularity of network computing over networks such as the Internet, more attention has been given to application programs that are executed by another computing device for client computing devices. For example, an application service provider (ASP) may offer a subscription service in which an application program is executed for subscribing clients by the ASP's server. The subscribing clients utilize the program over the Internet. Input and output is typically performed at the clients, while the execution of the program usually occurs at the server.

This model has some advantages. For example, small businesses that may not have adequate information technology (IT) departments can instead effectively outsource some or all of their application program needs to ASP's. This means that the businesses do not have to concern themselves with maintaining and updating the programs. Instead, nearly everything is handled by the ASP's. Moreover, rather than paying for program licenses, businesses instead pay on a subscription basis, which can be desirable.

Executing application programs by another computing device for client computing devices has disadvantages as well. One disadvantage is that the programs usually run slower than if executed by the client computing devices themselves. This is because the computing device hosting the application programs may have to run a number of instances of the programs for a number of different client computing devices. Even if the computing device hosting the application program can sufficiently handle this load, network latency can affect the speed at which the programs run. The fastest Internet connections are still typically slower than the internal speeds at which a computer runs. Congestion within the Internet can also affect the speed with which client computing devices interact with application programs executed by another computing device. For these and other reasons, there is a need for the present invention.

SUMMARY OF INVENTION

The invention provides caching and executing an application program by a client computing device or a caching computing device. In accordance with the present invention, an entire application program may be cached, or only a portion of the application program may be cached. A client computing device, a caching computing device, or both devices, are used to cache the application program. The devices cache the application program from an original computing device. Where the application program or a portion thereof is cached at the client computing device, the client computing device executes the cached application programs for itself or the cached portion. If the application program or a portion thereof is cached at a caching device, the caching computing device executes the cached application program or the cached portion for the client computing device. A portion of the application program may also reside in the original computing device, which also executes this portion of the application program for the client computing device.

In accordance with the present invention, the client computing device generates a request for an application program to be executed by the original computing device for the client computing device. If the client computing device has the capability to cache the application program, it intercepts and examines the request to determine if the request relates to any application program that it has already cached. If so, then the request is redirected to a cached application program for execution by the client computing device itself. Otherwise, the client computing device passes the request to a caching computing device or an original computing device.

If a caching computing device having application caching capability is present, it intercepts and examines the requested passed to it by the client computing device to determine if the request relates to any application program that it has already cached. If so, then the request is redirected to a cached application program for execution by the caching computing device for the client computing device. Otherwise, the caching computing device passes the request to an original computing device, which fulfills the request by executing the requested application program for the client computing device.

Application caching is different from content caching. Content caching is limited to the storage of data at a location closer to a client computing device than the original storage location. When the client computing device desires to access the content, it ultimately receives the content from the closer location. This is presumably faster than receiving the content from the more distant location. Content caching is a relatively simple process. The computing devices that are storing the content do not actually execute anything. The devices exist only to serve the content to client computing devices, while the client computing devices themselves may wholly execute some of the content.

Conversely, application caching involves downloading and installing at least a part of an application program on a caching computing device. The caching computing device is compatible with the original computing device. Configuration parameters are downloaded and interpreted by the caching computing device to determine how to install the program. Unlike a content caching computing device that only serves content to client computing devices, an application caching computing device executes at least part of an application program for the client computing devices. No execution of the data is typically performed by a content caching computing device.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Overview of the Invention

Figure 1:
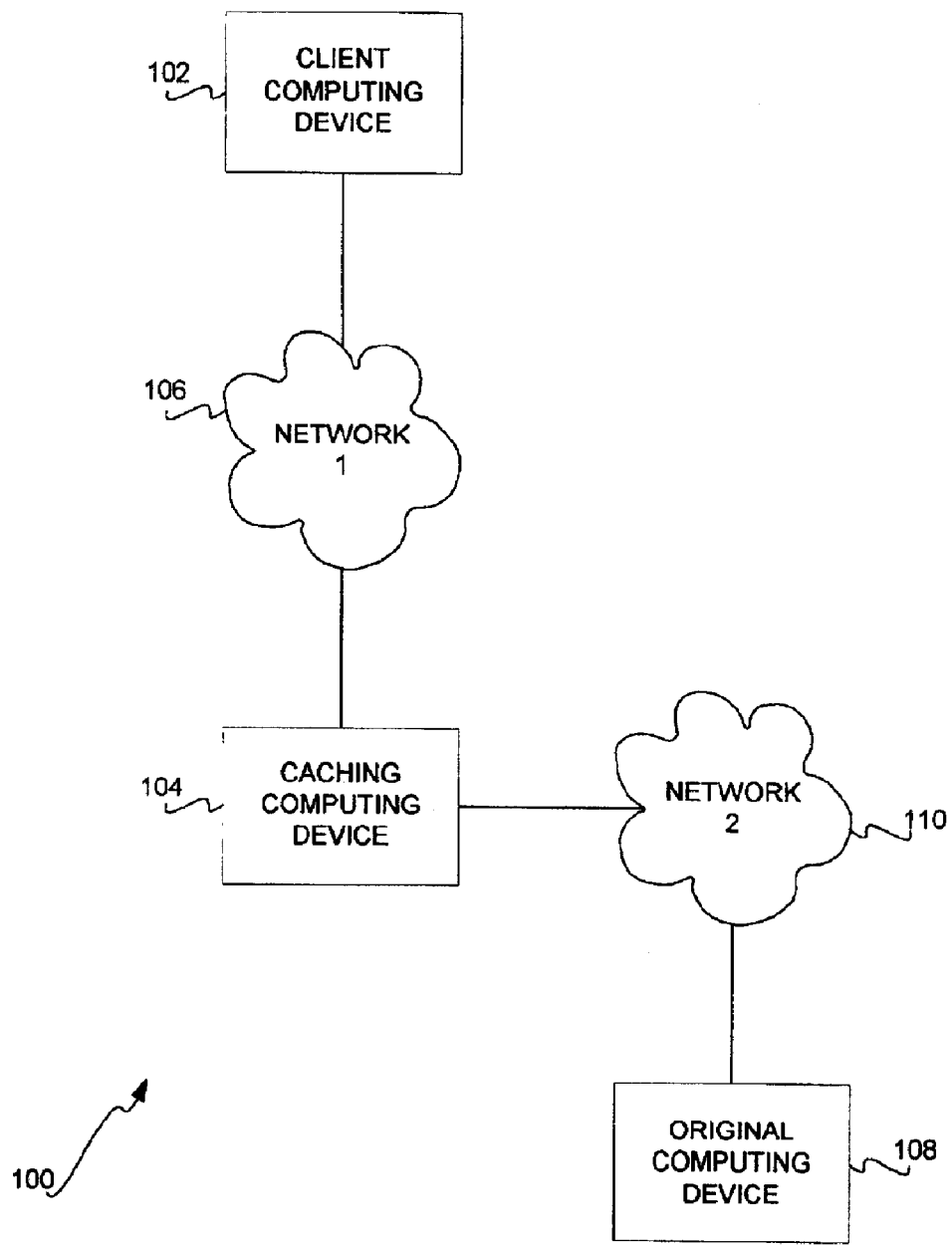
FIG. 1 is a diagram showing the basic configuration of a client computing device, a caching computing device, and an original computing device, according to preferred embodiments of the invention.

The diagram 100 of FIG. 1 illustrates the basic configuration for preferred embodiments of the invention. A client computing device 102 is communicatively connected to a caching computing device 104 through a first network 106. The caching computing device 104 is communicatively connected to an original computing device 108 through a second network 110. Each of the computing devices 102, 104, and 108 can be a computer, such as a desktop or a laptop computer. There can be more than one of each of the devices 102, 104, and 108. Only one of each device is shown in FIG. 1 for illustrative clarity.

A cacheable application program is initially installed only on the original computing device 108. The application program can be any type of business- or consumer-related application program. Examples of application programs include word processing programs, spreadsheet programs, communication programs, and other kinds of programs. The caching computing device 104 has cached all or part of the cacheable application program, and executes the cached portion of the application program for the client computing device 102. If part of the application program is not cached by the caching computing device 104 but remains at the original computing device, then the original computing device 108 executes this portion of the program for the client computing device 102. The client computing device 102 can also cache and execute a portion of the application program for itself.

The application program may be partitioned into different parts that are executed by one or all of the client computing device 102, the caching computing device 104, or the original computing device 108, depending on each device's characteristics. Graphical user interface aspects of the program may be cached at and executed directly by the client computing device 102. The bulk of the non-graphical user interface aspects of the program may be cached at and executed by the caching computing device 104 for the client computing device 102. The original computing device 108 may only execute rarely used aspects of the application program for the client computing device 102.

Figure 2:
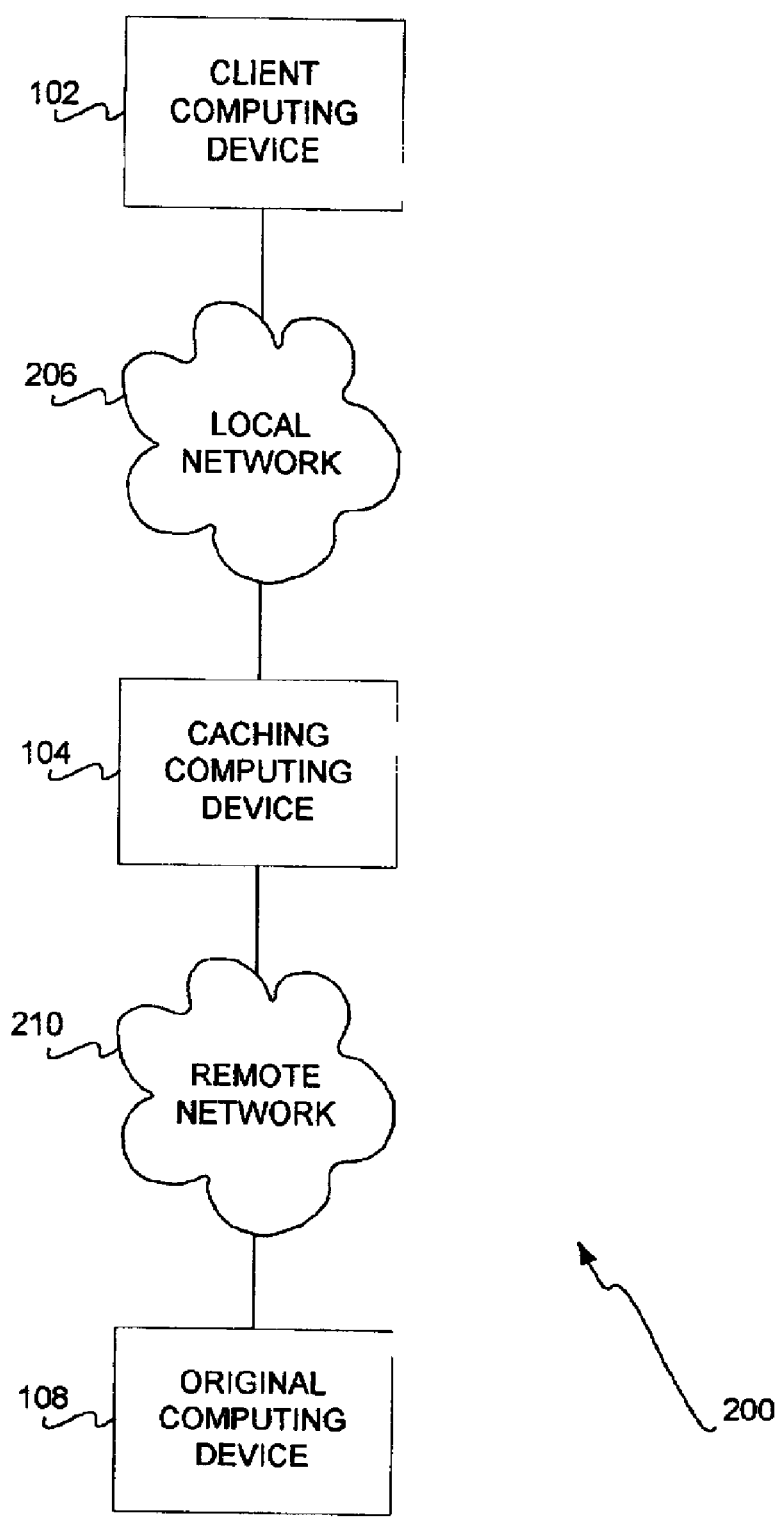
FIG. 2 is a diagram showing a more specific example of the configuration of FIG. in which the client computing device is communicatively connected to the caching computing device through a local network, and the caching computing device is communicatively connected to the original computing device through a remote network, according to an embodiment of the invention.

The first network 106 and the second network 110 can be different networks, or the same network. Examples of networks include local-area networks (LAN's), wide-area network (WAN's), intranets, extranets, the Internet, local networks, remote networks, and other types of networks. FIG. 2 shows a diagram 200 of a specific embodiment of the configuration of FIG. 1. The network 106 of FIG. 1 is a local network in FIG. 2, as denoted by reference number 206, and the network 110 of FIG. 1 is a remote network, as denoted by reference number 210. The local network 206 and the remote network 210 primarily differ by the distances between their connected devices. Compared to the original computing device 108 and the caching computing device 104 connected through the remote network 210, the client computing device 102 is physically closer to the caching device 104 since they are connected through the local network 206.

Preferably, the cached portion of the application program cached at and executed by the caching computing device 104 for the client computing device 102 runs faster from the device 104 than any non-cached portion executed by the original computing device 108. This can be for any number of reasons: First, the caching computing device 104 may not have to execute the application program for as many clients as the original computing device 108 does. Second, the local network 206 may be a faster network than the remote network 210. Moreover, the local network 206 may be less congested than the remote network 210. However, any portion of the application program cached and executed by the client computing device 102 itself may run faster than if it is cached at and executed by the caching computing device 104 or if it is executed by the original computing devices 108.

Figure 3:
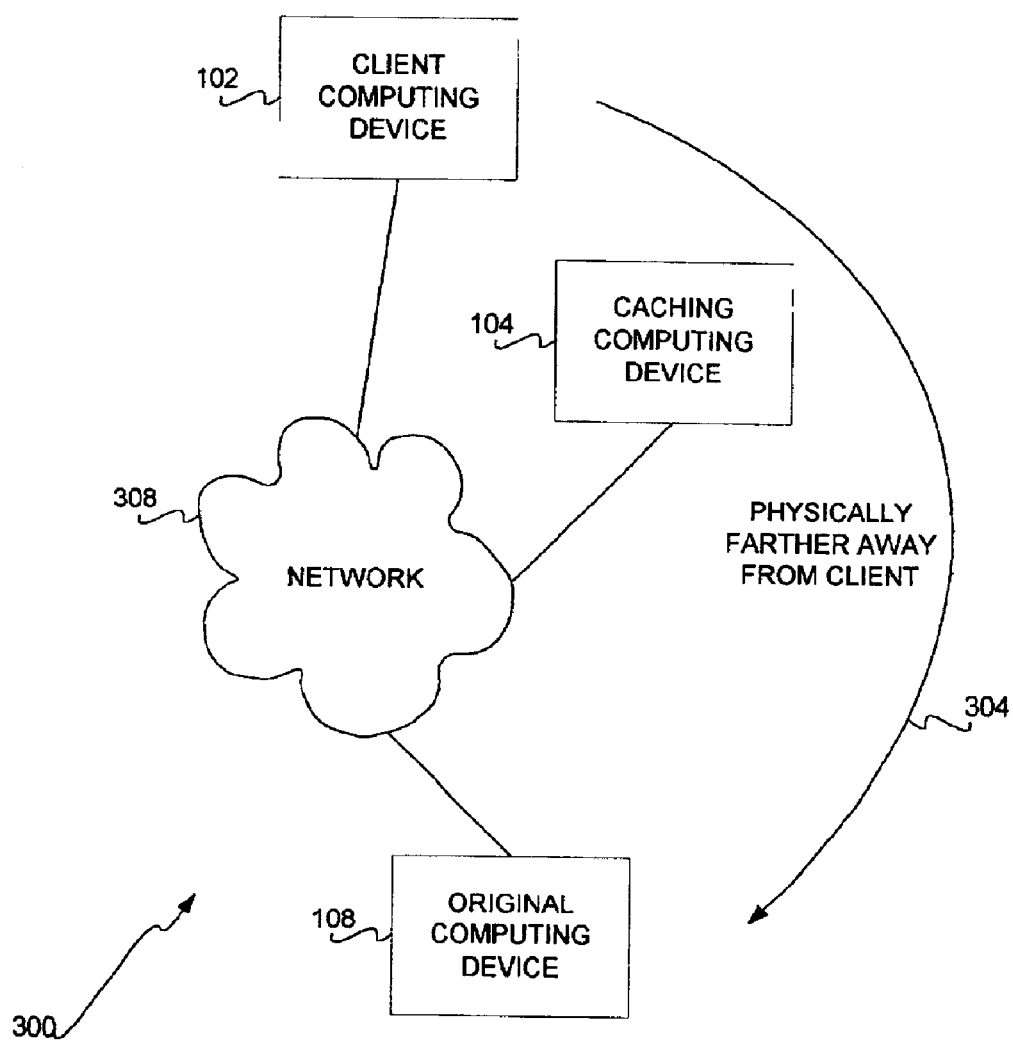
FIG. 3 is a diagram showing another more specific example of the configuration of FIG. 1, in which the client, caching, and original computing devices are communicatively connected to one another through the same network, according to an embodiment of the invention.

Referring back to FIG. 1, the first network 106 and the second network 110 may be the same network. FIG. 3 shows a diagram 300 of an embodiment in which the networks 106 and 110 of FIG. 1 are the same network 308. For example, the network 308 may include or be the Internet. As denoted by the curved distance indication arrow 304, the original computing device 108 is located physically farther away from the client computing device 102 than the caching computing device 104 is. For example, the client computing device 102 may be located in Seattle, the caching computing device 104 in Chicago, and the original computing device 108 in London. As a result, the cached portion of the application program executed by the caching computing device 104 for the client computing device 102 generally runs faster than the portion executed by the original computing device 108. Any portion cached and executed by the client computing device 102 itself may runs faster still.

As has been described by reference to FIGS. 1, 2 and 3, the invention relates to caching all or part of an application program by a client computing device 102 and/or a caching computing device 104. The device 104 executes its cached portion of the program for the device 102, and the device 102 executes its cached portion for itself. The application program may be partitioned into different parts, where each part is executed for the client computing device 102 by either the device 102, 104 or 108.

A subsequent section of the detailed description describes how an application program originally meant for execution by an original computing device 108 for a client computing device 102 is instead executed by the device 102 or a caching computing device 104. Another section describes in detail how a program is downloaded from the original computing device 108 and installed by the caching computing device 104 or the client computing device 102. An example computing device that can implement any of the devices 102, 104 and 108 is also described in a subsequent section of the detailed description.

Execution of a Cacheable Program by a Caching or a Client Computing Device

Figure 4:
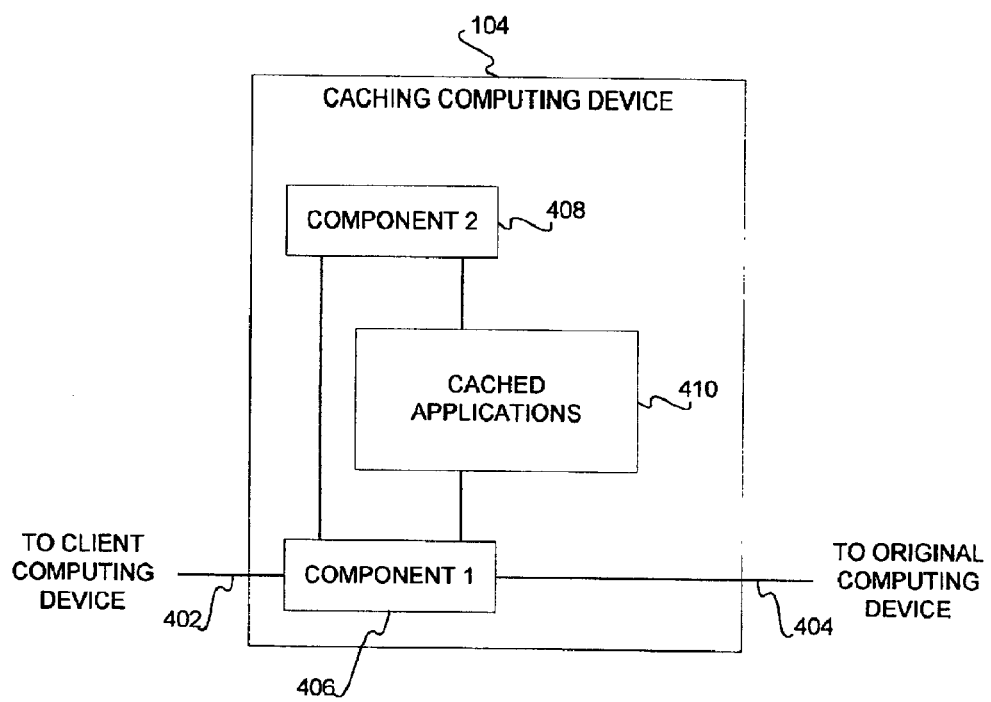
FIG. 4 is a diagram showing the caching computing device of FIG. 1 in more detail, according to an embodiment of the invention.

FIG. 4 is a diagram showing an embodiment of the caching computing device 104 of FIG. 1 in more detail. The caching computing device 104 is communicatively connected to the client computing device, as indicated by the line 402, and to the original computing device, as indicated by the line 404. The caching computing device 104 includes a first component 406, a second component 408, and cached applications 410. The first component 406 and the second component 408 can be referred to as a plug-in and a service, respectively. They can be implemented within a single component. A component as used in this application refers to one or more sections of computer instructions, computer program modules, computer programs, and software objects.

The first component 406 intercepts requests from the client computing device that are directed to application programs. The first component 406 determines whether a given request relates to a part of an application that is cached in the cached applications 410. If so, the component 406 redirects the request to the relevant application within the cached applications 410. Execution thus occurs at the caching computing device 104, and not at the original computing device. If a given request does not relate to a part of an application that is cached in the cached applications 410, then the component 406 passes the request through to the original computing device.

Figure 5:
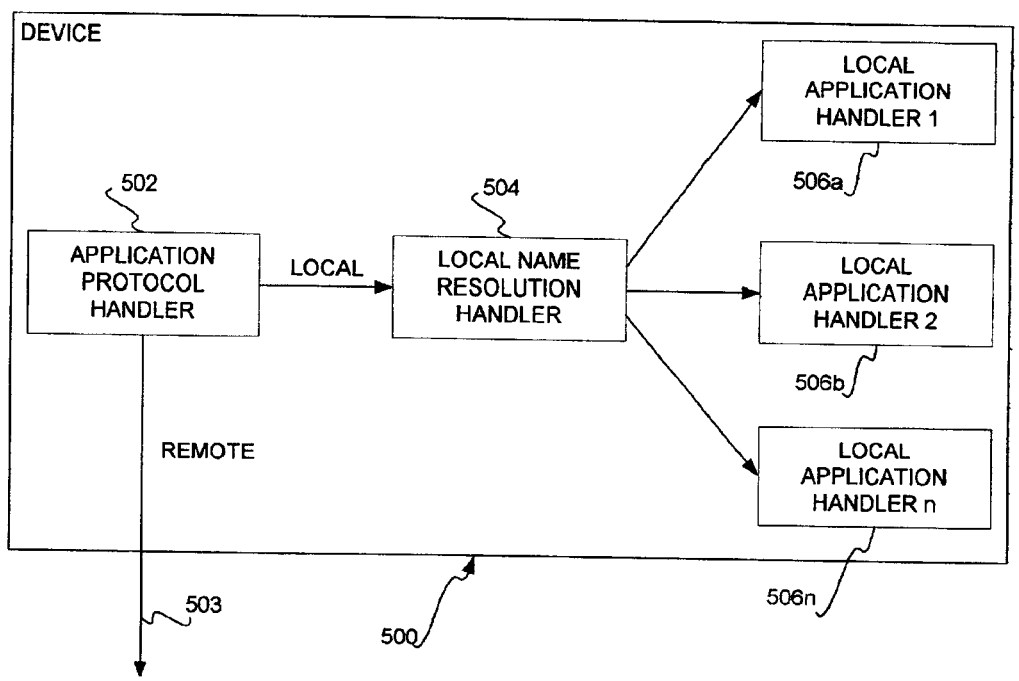
FIG. 5 is a diagram showing how a device, such as the client computing device or the caching computing device, intercepts, passes through, and redirects application program requests, according to an embodiment of the invention.

FIG. 5 is a diagram that illustrates how in one embodiment a device 500 particularly intercepts, redirects, and passes through application program requests. The device 500 can be the caching computing device 104 of FIGS. 1 and 4. The application protocol handler 502 of the device 500 intercepts application program requests. A protocol specifies the form of the requests. A request may be in the form "rapp://www.aspco.com/program/directory/request.ext." The indicator "rapp:" is used to specify that the request relates to a particular protocol, such as a "remote application program protocol." The domain name "www.aspco.com" specifies a resource location, such as on the Internet. The indicators "program/" and "directory/" specify particular directories at this location, where "program/" is specifically used to identify the program that is being accessed. The request is made to a file at this location, as indicated by "request.ext".

The application protocol handler 502 examines all network traffic from the client computing device. If an item of traffic is preceded by the indicator "rapp:", then the handler 502 further determines whether the program specified by the request relates to a program that has been cached on the device 500. If it does not, then the handler 502 passes the request through, as indicated by the arrow 503. Otherwise, the handler 502 passes the request to the local name resolution handler 504.

The local name resolution handler 504 redirects the application program request to the appropriate cached application. The handler 504 modifies the request to point to a particular handler for the program, from the local application handlers 506a, 506b, . . . , 506n. An example of a request is "rapp://www.aspco.com/wordprocessing/request.ext." If the local application handler 506b corresponds to the application indicated in this request, then the handler 504 modifies the request to point to the local application handler 506b. The local application handler 506b may be identified by "c:/wordprocessing/". "c:" refers to a physical location within the device 500, such as a hard disk drive, and "wordprocessing/" refers to a directory at this physical location. The handler 504 modifies the request to "c:/wordprocessing/request.ext", and the handler 506b handles the request for the cached application.

As has been described, an entire application may not have to be cached. Rather, only one or more parts of the application may be cached. In this situation, each application part may have its own local application handler within handlers 506a, 506b, 506n. Application program requests are thus more accurately described as application program component requests, where each application component can be independently cached on the device 500. A given application program may comprise only one component, or a number of components. Where only one component makes up an application program, either the entire program or none of the program can be cached. Where a number of components make up an application program, any of the components can be cached.

Referring back to FIG. 4, preferably, the client computing device has no knowledge that execution may occur at the caching computing device 104 instead of at the original computing device. The redirection and caching process performed by the caching computing device 104 is preferably transparent to the client computing device. This means that the client computing device does not have to be reconfigured to afford execution by the caching computing device 104.

The second component 408 determines whether or not application programs that have not been cached in the cached applications 410 should be downloaded and installed on the caching computing device 104. The component 408 constantly tracks client usage of application programs that are executed by the original computing device. The component 408 periodically assesses whether usage by the client computing device is sufficient to justify caching the application program for execution by the caching computing device 104. The component 408 may download and install part or all of the program into the cached applications 410. Any criteria may be used to determine whether a program should be cached by the caching computing device 104.

Figure 6:
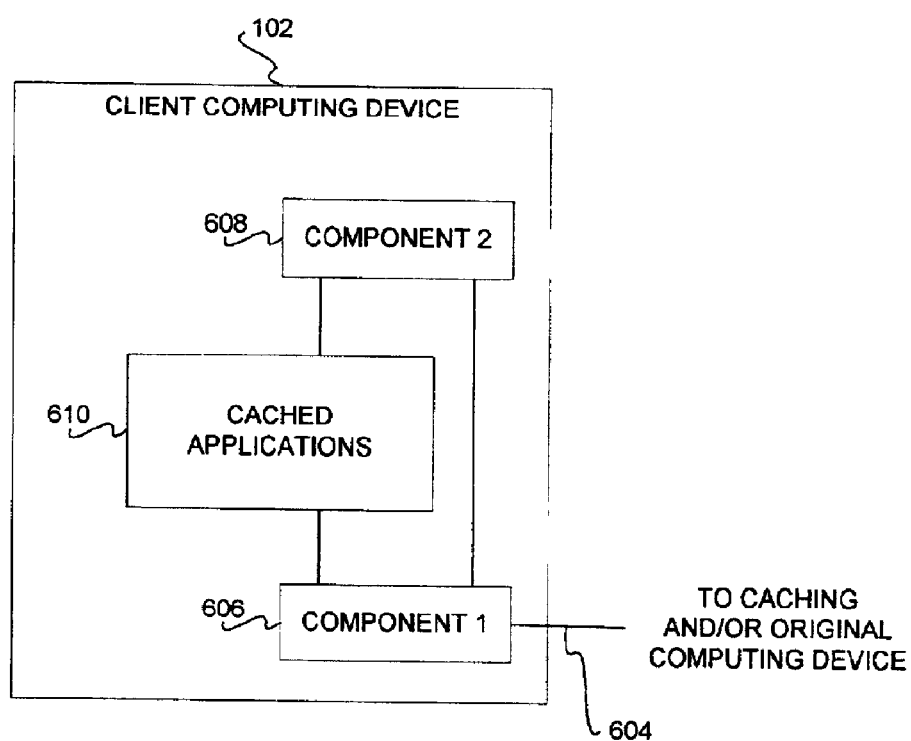
FIG. 6 is a diagram showing the client computing device of FIG. 1 in more detail, according to an embodiment of the invention.

The client computing device may similarly cache and execute cached application programs or portions thereof. FIG. 6 is a diagram showing an embodiment of the client computing device 102 of FIG. 1 in more detail. The client computing device 102 is communicatively connected to the caching and/or the original computing device, as indicated by the line 604. Like the caching computing device 104 of FIG. 4, the client computing device 102 of FIG. 6 includes a first component 606, a second component 608, and cached applications 610. The first and the second components 606 and 608 can be referred to as a plug-in and a service, respectively, and can be implemented within a single component.

The first component 606 intercepts internal requests from the client computing device 102 that are directed to application programs. The first component 606 determines whether a given request relates to a part of an application that is cached in the cached applications 610. If so, the component 606 redirects the request to the part of the relevant application within the cached applications 610. Execution thus occurs at the client computing device 102, and not at either the original or the caching computing device. If a given request does not relate to a part of an application that is cached in the cached applications 610, then the component 606 passes the request through to the caching or the original computing device. The client computing device 102 can also intercept, redirect, and pass through application program requests as has been described by reference to FIG.where the device 500 of FIG. 5 can be the device 102.

Still referring to FIG. 6, the second component 608 determines whether application programs that have not been cached in the cached applications 610 should be downloaded and installed on the client computing device 102. Preferably, the component 608 monitors usage of application programs by the client computing device 102 that are executed for the device 102 by either the original or the caching computing device. The component 608 periodically assesses whether usage is sufficient to justify caching part or all of an application program for execution by the client computing device 102. A criteria may be used to make this determination. When it is determined that an application program or a portion thereof should be cached at the client computing device 102, the component 608 downloads and installs the program or a portion thereof into the cached applications 610.

Figure 7:
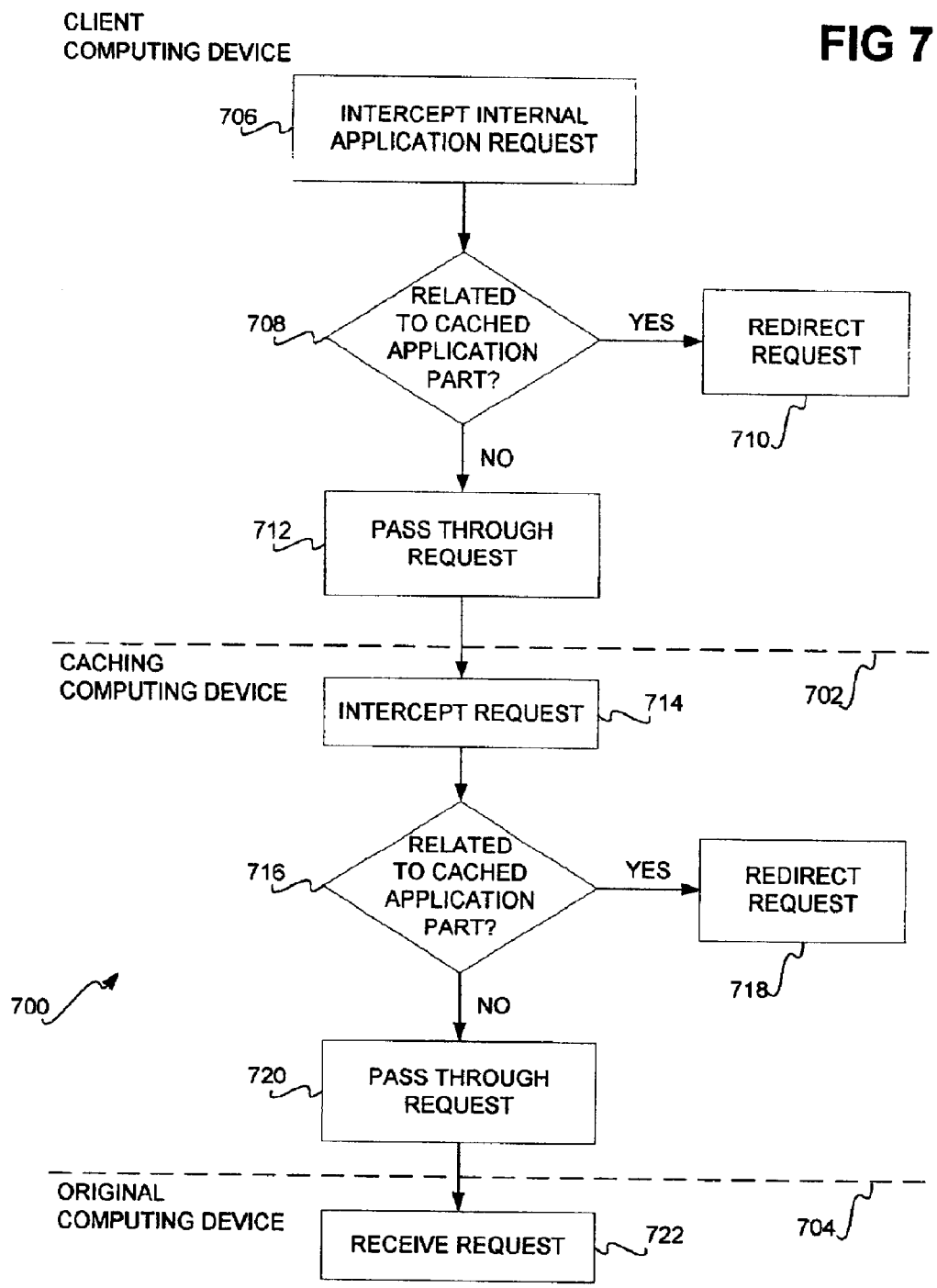
FIG. 7 is a flowchart of a method summarizing how the client, caching, and original computing devices handle an application program request.

FIG. 7 is a flowchart of a method 700 summarizing how the client, caching, and original computing devices handle an application program request. The application program is initially installed only on the original computing device. Part or all of the program may subsequently be cached by the client computing device and/or the caching computing device. As indicated by the dotted lines 702 and 704, some parts of the method 700 are performed by the client computing device, some parts are performed by the caching computing device, and some parts by the original computing device. In particular, 706, 708, 710, and 712 are performed by the client computing device, 714, 716, 718, and 720 are performed by the caching computing device, and 722 by the original computing device.

In 706, the client computing device intercepts an internally generated request to an application program. In 708, the client computing device determines whether the request relates to a part of an application program that has been cached by the client device. If so, then the request is redirected in 710 so that the request is handled by the client computing device. The part of the application program to which the request relates is executed by the client computing device. If the request does not relate to a cached application, then the client computing device passes through the request in 712.

In 714, the caching computing device intercepts the request passed through by the client computing device in 712. The caching computing device in 716 determines whether or not the request relates to a part of an application that has been cached by the caching device. If so, then the request is redirected in 718 so that the request is handled by the caching computing device. The part of the application program to which the request relates is executed by the caching computing device for the client computing device. If the request does not relate to a cached application part, then the caching computing device passes through the request in 720. The original computing device receives the request in 722, and handles the request. The part of the application program to which the request relates is executed by the original device for the client device.

Figure 8:
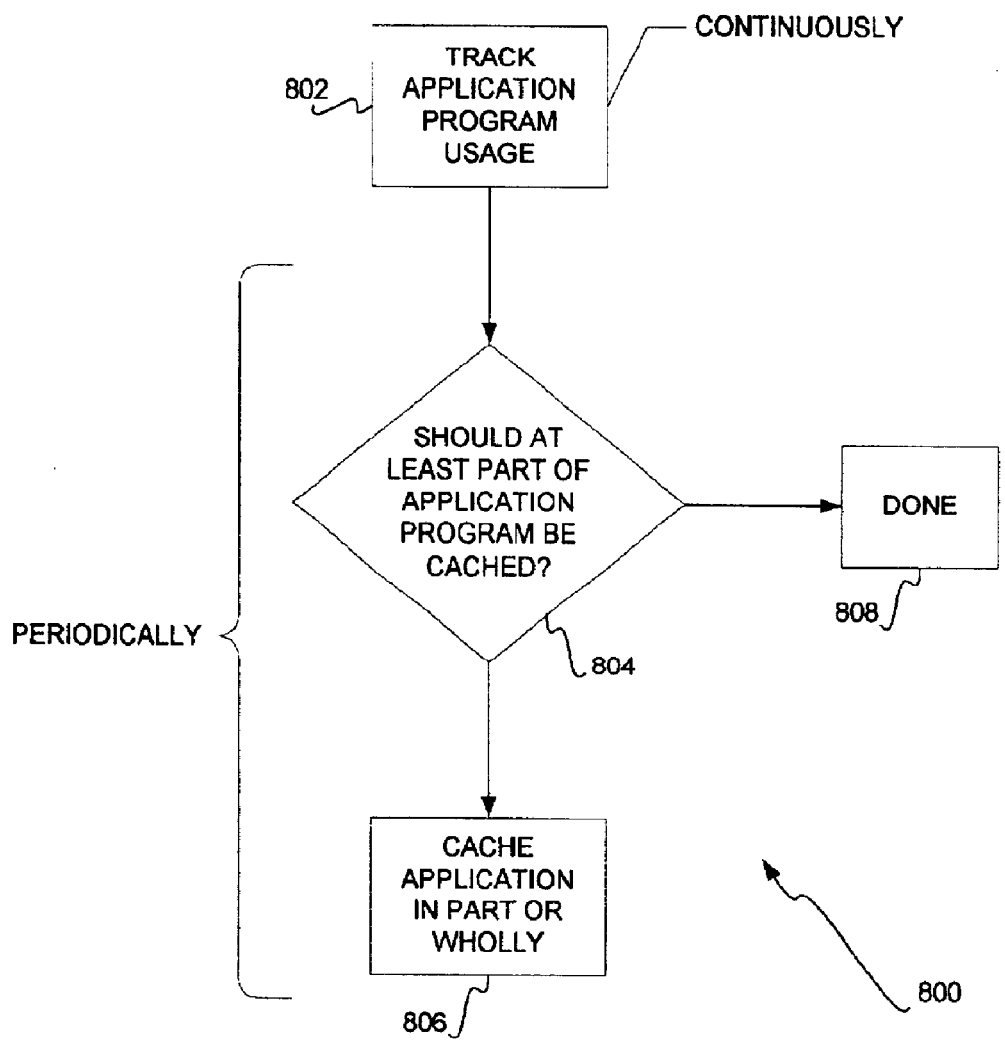
FIG. 8 is a flowchart of a method summarizing how the client computing device or the caching computing device determines whether part or all of an application program should be cached.

FIG. 8 is a flowchart of a method 800 summarizing how to determine whether part or all of an application program should be cached. The caching computing device can perform the method 800 to determine whether it should cache at least a portion of the program. Likewise, the client computing device may perform the method 800. In 802, the method tracks application program usage. Preferably, usage tracking is continuously performed. Periodically, the method determines in 804 whether at least part of an application program should be cached, based on a criteria. If not, then the method ends in 808. Otherwise, in 806, the method caches at least part of the program. The next section of the detailed description describes how a cacheable application program can be cached.

Caching (Downloading and Installing) a Cacheable Application Program

Figure 9:
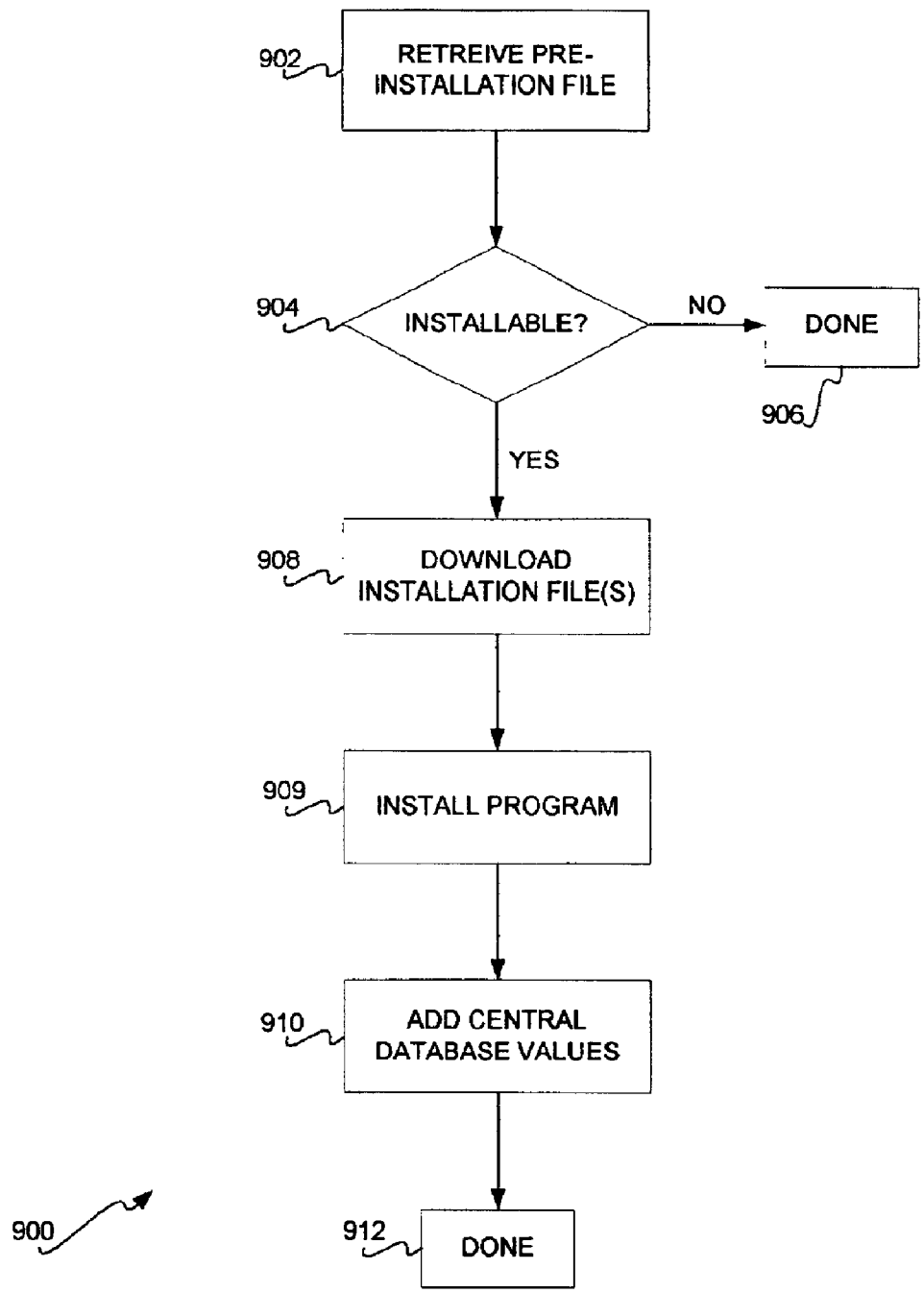
FIG. 9 is a flowchart of a method showing how a client computing device or a caching computing device downloads and installs an application program, or an application program component, for local execution, according to an embodiment of the invention; and, FIG. 10 is a diagram of an example computing device, which may implement any of the caching, client, or original computing devices of FIG. 1.

FIG. 9 is a flowchart of a method 900 showing how one embodiment downloads and installs a cacheable application program. The method 900 is performed by the second component 408 of the caching computing device 104 of FIG. 4, or the second component 608 of the client computing device 102 of FIG. 6. The components perform the method 900 after they have determined that an application program should be cached. The caching process of the method 900 may fail at any point within the process. If this occurs, then the method 900 exits without having successfully cached the application program, which is not specifically called out in FIG. 9.

The description in this section focuses on downloading and installing an entire application program, which has not been partitioned into separate application program components. The description is also applicable to caching a component of an application program, by performing the method 900 relative to such component, instead of to an entire application program. A cacheable application program or a component thereof is one that can be downloaded and installed as described in this section.

In 902, the method retrieves a pre-installation file for an application program from its original remote location at the original computing device. The pre-installation file is also referred to as a manifest. The manifest includes configuration and other information necessary for the program to be successfully cached. At a minimum, the manifest references the installation file(s) for the program that must be download and installed. Preferably, the manifest also references the amount of local storage space the application will occupy, and optionally the platform on which the application is intended to run. The manifest may also contain descriptive information such as the name of the application, the version of the application, a brief description of the application, and other information.

In 904, the method determines whether or not the application program is installable on the computing device performing the method. This primarily involves two checks. First, the method verifies that the amount of available local storage space is sufficient for the program to be installed. The available local storage space may be the free space available on the hard disk drive of the computing device. Second, the method verifies that the computing device is compatible with the platform on which the application program is intended to be installed. The platform of the manifest may indicate the minimum version of an operating system on which the program can run. If the method determines that the application is not installable, then it proceeds to 906, where the method exits without having installed the application program.

If the application program is installable, then the method proceeds to 908, where it downloads the installation file(s) specified by the manifest. In 909, the method installs the program on the device running the method by utilizing the installation file(s). The installation file(s) may be one or more cabinet (.CAB) files, which are installable on a computing device in a known manner. In 910, the method adds values regarding the installed application program in a central database. The central database is also referred to as a registry. Cached application programs are maintained in the registry, in which their original locations, such as on the original computing device, are mapped to their cached locations on the computing device. This enables redirection of program requests to the cached application programs. The registry may also maintain relevant installation information regarding the application programs, such as the time of installation and application usage information.

For example, the method can add the following values to the registry for an installed application program:

1. The original location of the application program.

2. The system time at which the program was installed.

3. An application identifier, which can be automatically generated as a guaranteed unique identifier (GUID).

4. The physical location on the computing device where the application has been installed and where it can be executed from, which can be determined by a hash algorithm based on the application identifier.

5. The last time the application program was accessed, which defaults to the time of installation until the program is executed.

Once the method has successfully cached the application program, it is finished in 912.

Example Computing Device

Figure 10:
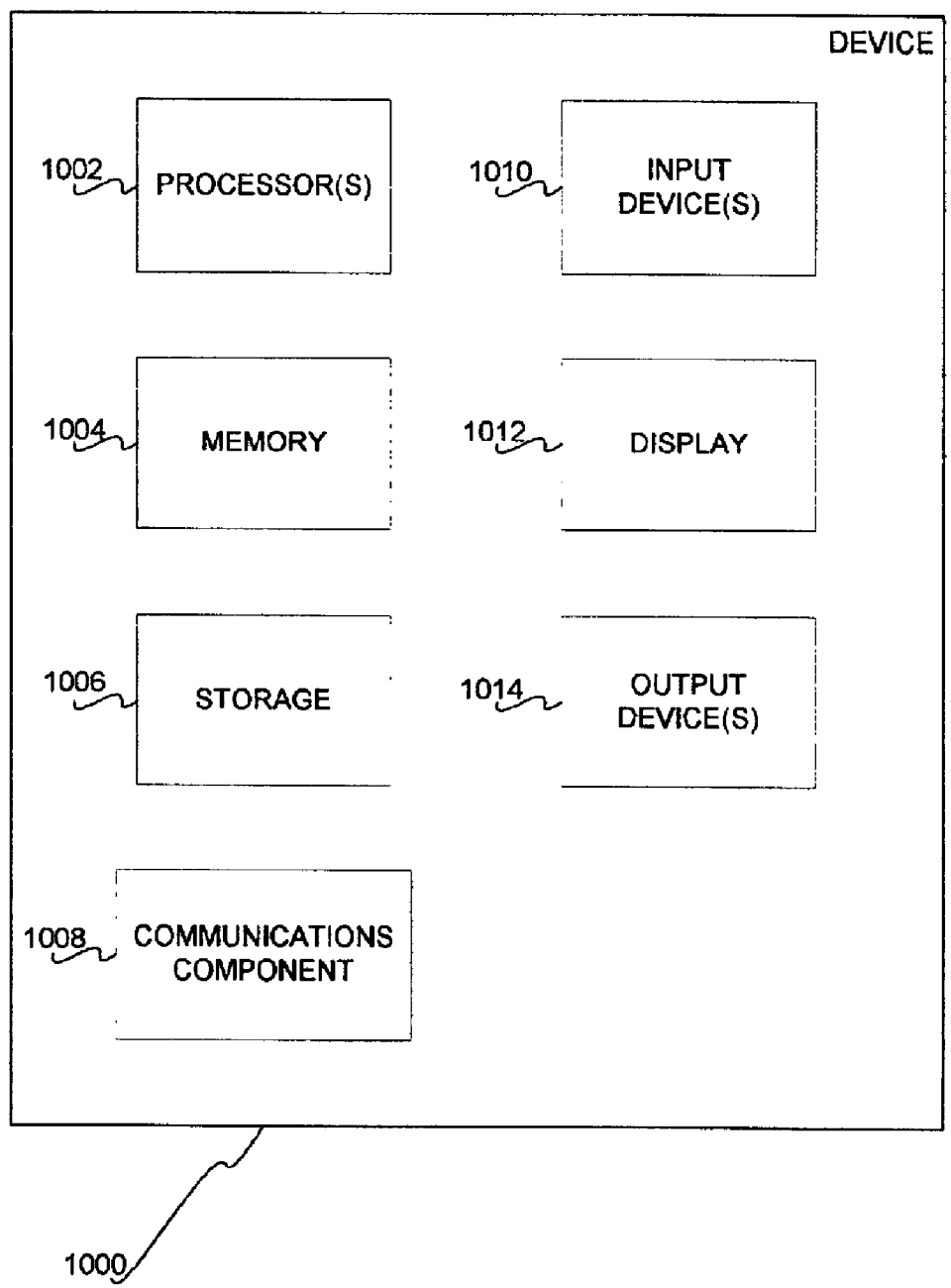

FIG. 10 is a diagram of an exampling computing device 1000. Any of the client computing device 102, the caching computing device 104, and the original computing device 108 of FIG. 1 can be implemented as the example device 1000. The example computing device 1000 can be, for example, a desktop computer, a laptop computer, or a personal digital assistant (PDA). The invention may be practiced with other computer system configurations as well, including multiprocessor systems, microprocessor-based or programmable consumer electronics, network computers, minicomputers, and mainframe computers. The invention may be practiced in distributed computing environments where tasks are performed by remote processing devices that are linked through a communications network.

The device 1000 includes one or more of the following components: processor(s) 1002, memory 1004, storage 1006, a communications component 1008, input device(s) 1010, a display 1012, and output device(s) 1014. For a particular instantiation of the device 1000, one or more of these components may not be present. For example, a PDA may not have any output device(s) 1014. The description of the device 1000 is to be used as an overview of the types of components that typically reside within such a device, and is not meant as a limiting or exhaustive description.

The processor(s) 1002 may include a single central-processing unit (CPU), or a plurality of processing units, commonly referred to as a parallel processing environment. The memory 1004 may include read-only memory (ROM) and/or random-access memory (RAM). The storage 1006 may be any type of storage, such as fixed-media storage devices and removable-media storage devices. Examples of the former include hard disk drives, and flash or other non-volatile memory. Examples of the latter include tape drives, optical drives like CD-ROM drives, and floppy disk drives. The storage devices and their associated computer-readable media provide non-volatile storage of computer-readable instructions, data structures, program modules, and other data. Any type of computer-readable media that can store data and that is accessible by a computer can be used.

The device 1000 may operate in a network environment. Examples of networks include the Internet, intranets, extranets, local-area networks (LAN's), and wide-area networks (WAN's). The device 1000 may include a communications component 1008, which can be present in or attached to the device 1000. The component 1008 may be one or more of a network card, an Ethernet card, an analog modem, a cable modem, a digital subscriber loop (DSL) modem, and an Integrated Services Digital Network (ISDN) adapter. The input device(s) 1010 are the mechanisms by which a user provides input to the device 1000. Such device(s) 1010 can include keyboards, pointing devices, microphones, joysticks, game pads, and scanners. The display 1012 is how the device 1000 typically shows output to the user. The display 1012 can include cathode-ray tube (CRT) display devices and flat-panel display (FPD) display devices. The device 1000 may provide output to the user via other output device(s) 1014. The output device(s) 1014 can include speakers, printers, and other types of devices.

The methods that have been described can be computer-implemented. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution, and installation and execution on another computer. The program or programs can be a part of a computer system, a computer, or a computing device.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A computing device comprising:
a cacheable application program component of an application program that has been cached from an original computing device and is compatible with an execution platform of the computing device; and,
a redirection component to intercept requests for an application program component and direct any of the requests that relate to the application program component that has been cached to the application program component that has been cached so that the application program component can be executed outside the original computing device, the redirection component comprising:
a first handler to determine whether a request comprises an application program component request for any cacheable application program component that has been cached;
a second handler for the application program component that has been cached; and,
a third handler to receive the request from the first handler in response to the first handler determining that the request comprises an application program request for any cacheable application program component that has been cached, and to direct the request to the second handler in response to determining that the request relates to the application program component that has been cached.

2. The device of claim 1, wherein the cacheable application program component constitutes the only component of a cacheable application program, such that the cacheable application program is wholly cached.

3. The device of claim 1, wherein the device is a client computing device.

4. The device of claim 1, wherein the device is a caching computing device.

5. The device of claim 1, wherein the redirection component is further to otherwise pass the application program component requests that are irrelevant to the application program that has been cached to another computing device.

6. The device of claim 1, further comprising a caching component to track usage of application program components.

7. The device of claim 6, wherein the caching component is further to assess whether the usage of any of the application program components is sufficient to justify caching.

8. The device of claim 7, wherein the caching component is further to cache any of the application program components that the usage of which has been assessed as sufficient to justifying caching.

9. The device of claim 8, wherein the caching component is to cache any of the application program components by downloading one or more installation files from the original computing device.

10. The device of claim 1, wherein the redirection component comprises:
an application protocol handler configured to, at least:
intercept requests to execute application program components, each request referencing at least one application program component; and
pass through other types of requests;
a plurality of local application handlers corresponding to a plurality of cached application program components; and
a local name resolution handler configured to, at least;
receive requests to execute application program components from the application protocol handler; and
resolve each of the at least one application program component to at least one of the plurality of local application handlers.

11. A computing device comprising:
a cacheable application program component that has been cached from an original computing device and is compatible with an execution platform of the computing device; and,
a component to execute the application program component in response to a request, the request from an internal intercepting component capable of intercepting and redirecting the request, the component to execute the application program component in lieu of execution by the original computing device, the internal intercepting component comprising:
a first handler to determine whether the request comprises an application program component request for any cacheable application program component that has been cached;
a second handler for the application program component that has been cached; and,
a third handler to receive the request from the first handler in response to the first handler determining that the request comprises an application program request for any cacheable application program component that has been cached, and to direct the request to the second handler in response to determining that the request relates to the application program component that has been cached.

12. The device of claim 11, wherein the computing device is a client computing device, and the component to execute the application program component executes the application program component for itself in lieu of execution by the original computing device for the client computing device, and the client computing device including the internal intercepting component, the internal intercepting component intercepting and redirecting the request transparent to a user.

13. The device of claim 11, wherein the computing device is a caching computing device, and the component to execute the application program component executes the application program component for a client computing device, the client computing device including the internal intercepting component, the component to execute in lieu of execution by the original computing device for the client computing device.

14. A system comprising:
a client computing device communicatively connected to a network, the client computing device including an internal intercepting component capable of intercepting and redirecting a request, the internal intercepting component comprising:
a first handler to determine whether the request comprises an application program component request for any cacheable application program component that has been cached;
a second handler for an application program component that has been cached; and,
a third handler to receive the request from the first handler in response to the first handler determining that the request comprises an application program request for any cacheable application program component that has been cached, and to direct the request to the second handler in response to determining that the request relates to the application program component that has been cached; and, a caching computing device to cache at least one cacheable application program component from an original computing device and execute the at least one component for the client computing device in response to the request, the caching computing device having an execution platform compatible with the at least one component and also communicatively connected to the network.

15. The system of claim 14, wherein any of the at least one application program components cached by the caching computing device constitute the only component of a cacheable application program, such that the cacheable application program is wholly cached by the caching computing device caching the cacheable application program component.

16. The system of claim 14, wherein the client computing device is further to cache at least one cacheable application program component from the original computing device and execute the at least one component for itself.

17. The system of claim 16, wherein any of the at least one application program components cached by the client computing device constitute an only component of a cacheable application program, such that the cacheable application program is wholly cached by the client computing device caching the cacheable application program component.

18. The system of claim 14, wherein the original computing device is also communicatively connected to the network.

19. The system of claim 14, wherein the original computing device is communicatively connected to a second network, the caching computing device also communicatively connected to the second network.

* * * * *